United States Patent [19]

Chilinski et al.

[11] Patent Number: 4,631,663
[45] Date of Patent: Dec. 23, 1986

[54] MACROINSTRUCTION EXECUTION IN A MICROPROGRAM-CONTROLLED PROCESSOR

[75] Inventors: Herbert Chilinski; Klaus J. Getzlaff, both of Schoenaich; Johann Hajdu; Franz J. Raeth, both of Boeblingen, all of Fed. Rep. of Germany

[73] Assignee: International Business Machines Corporation, Armonk, N.Y.

[21] Appl. No.: 500,583

[22] Filed: Jun. 2, 1983

[30] Foreign Application Priority Data

Jun. 8, 1982 [DE] Fed. Rep. of Germany ............. 82105015[U]

[51] Int. Cl.⁴ ............. G06F 9/22; G06F 9/40
[52] U.S. Cl. ............................................. 364/200
[58] Field of Search ........................... 364/200

[56] References Cited

U.S. PATENT DOCUMENTS

| | | |
|---|---|---|
| 3,736,563 | 5/1973 | Beckinger et al. ............. 340/172.5 |
| 3,872,447 | 3/1975 | Tessera et al. ................... 364/200 |
| 3,991,404 | 11/1976 | Brioschi et al. ............. 340/172.5 |
| 3,997,895 | 12/1976 | Cassonnet et al. ............. 364/200 |
| 4,075,687 | 2/1978 | Nissen et al. ................... 364/200 |
| 4,173,041 | 10/1979 | Dvorak et al. .................. 364/200 |
| 4,376,976 | 3/1983 | Lahti et al. ..................... 364/200 |

OTHER PUBLICATIONS

IBM Technical Disclosure Bulletin, vol. 9, No. 7, Dec. 1966, "Double Usage of Read-Only Storage", to J. F. Kevill, p. 796.

IBM Technical Disclosure Bulletin, vol. 14, No. 1, Jun. 1971, "Combined Macro/Micro Program Machine", to M. Faix et al, p. 298.

IBM Technical Disclosure Bulletin, vol. 16, No. 4, Sep. 1973, "Read-Only Storage Control for High-Speed Instruction Execution", to D. K. Hardin, pp. 1106-1108.

*Primary Examiner*—James D. Thomas
*Assistant Examiner*—David L. Clark
*Attorney, Agent, or Firm*—James A. Kunkle; J. F. Villella; J. Levy

[57] ABSTRACT

In a microprogram-controlled processor, having an additional operating mode in which particular functions can be executed under direct hardware control, a mode latch signals whether microprogram instructions or directly controlled macro instructions are to be executed. The macroprogram instructions are conventionally executed. For the execution of directly controlled macro instructions, a control storage supplies a hardware control word associated with the macro instruction to be directly executed. The hardware control word contains a mode control bit for signalling that the direct hardware control mode is to be executed. The remainder of the hardware control word contains a plurality of direct control bits, each of which directly controls a hardware function. In an alternative embodiment multiple hardware control words are employed.

7 Claims, 12 Drawing Figures

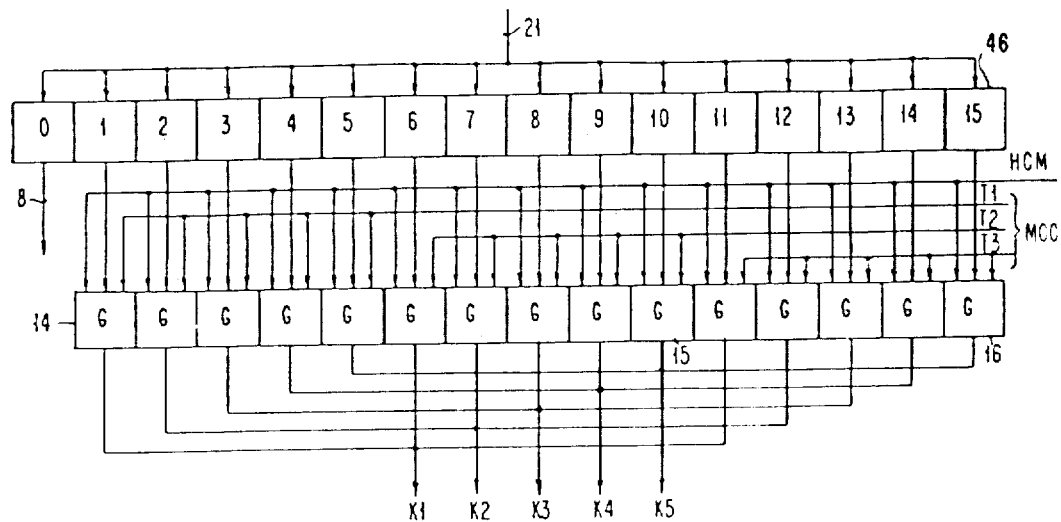
FIG. 4
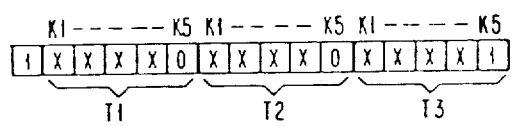
FIG. 5
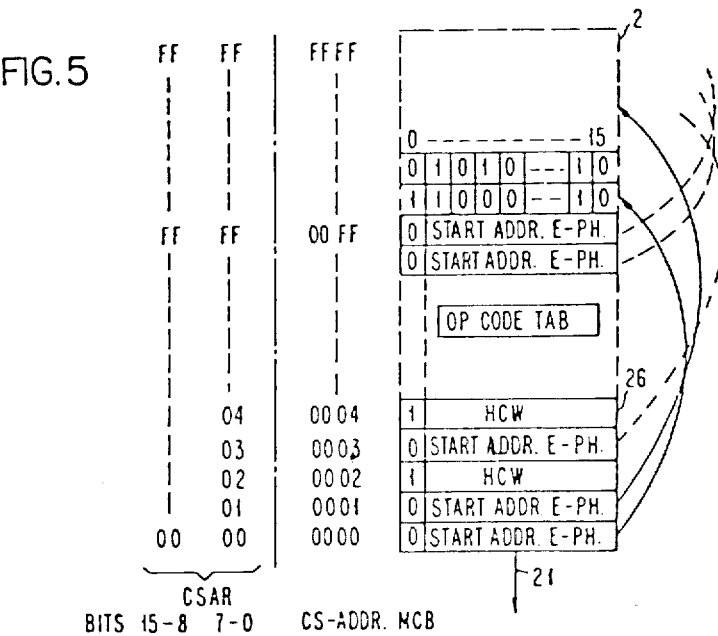

MACROINSTRUCTION EXECUTION IN A MICROPROGRAM-CONTROLLED PROCESSOR

TECHNICAL FIELD

This invention relates to the direct hardware-controlled execution of particular instructions in the instruction unit of a microprogram- controlled processor.

BACKGROUND ART

This invention is used in microprogram-controlled processors in which the operation code of the macroinstructions serves to address a control storage storing both an operation code table and the microinstructions which are required for executing the macroinstructions. The operation code of the macroinstruction is generally converted by the operation code table into an address which also refers to the control storage and at which the control storage contains the first microinstruction of a micro routine which is used to execute the respective macroinstruction.

The microinstructions read from the control storage, which are generally referred to as control words, are fed to a microinstruction operation register where they are buffered and from where they are fed to an instruction decoder linking the control words with the instruction cycle times, thus generating cycle time related control signals which subsequently control the data flow control elements, such as set inputs of registers, gate circuits, and the like. The sequential address of the respective next microinstruction of a routine can be generated in various ways. One way for example is by modifying the address of the control storage address register in a +1 modifier. Another way is by simply including it in the microinstructions proper.

In the earlier period of computer development, the control unit, also known as the instruction unit, generally contained permanently wired circuit logic. This had the following disadvantages: the structure of the logic was poorly organized and difficult to change; and the logic circuit costs were too high. Early attempts at improving the control units of processors led to a systematic storage-oriented structure of the control logic which was referred to as microprogramming and microprogram control, respectively. From the logic standpoint, a microprogram routine is a subroutine for executing a machine or macroinstruction.

At this time, the microprogram was written into read-only storages, whose outputs on the hardware level performed fixed control functions. The output lines were, for example, set lines for registers, or lines for gate control signals. A bit in a microinstruction indicated that the line for that microinstruction was to be activated. The structure of such a microinstruction was referred to as horizontal on account of its length of 100 bits or more.

The chief disadvantage of this approach is the poor utilization of the microprogram storage. The largest part of the storage capacity is not utilized since individual control signals are not required for each micro or control word. The relevant storage bits, since they are uncoded, do not contain information. Another problem arises when using a microinstruction with a vertical format. This format very much resembles that of a normal macroinstruction. The function of the instruction is contained in the operation code in a highly coded format. The remainder of the instruction substantially consists of address fields, because a microinstruction with a vertical format, unlike a microinstruction with a horizontal format, also permits addressing internal address registers. The microinstruction is more complex since its functional content corresponds to that of several otherwise serially executed horizontal instructions. This highly complex function has to be subdivided into appropriate individual steps, which in computers produced so far was generally done by a circuit-wired control logic.

In using such circuit-wired control logic, the microinstruction is merely used to invoke a hardware sequence control which decodes the operation code as well as other information, and converts the same into a sequence of elementary steps. This hierarchical structure leads to multiple use of the sequence control. The vertical format control storage can be slower since execution of the instructions takes longer because of the interconnected control logic. A strictly vertical format has the disadvantage that the control processes are heavily serialized, which adversely affects the processing speed of a processor as a whole.

A microinstruction with coded instruction fields, whose format can be referred to as quasi-horizontal, strikes a compromise between horizontal and vertical formats. The total operation code is divided into subfunctions which are rigidly linked with individual bit groups of the format. In addition, it is possible to insert direct control bits and similar function elements. A single instruction of this type causes more functions to be executed in parallel than an instruction with a vertical format, so that the instruction length may again reach 50 bits or more. Compared with the vertical format, decoding is simpler and faster.

A combination of a directly hardware-controlled machine and an interpretatively, i.e., microprogram-controlled, machine is well known. To increase the processing speed of microprogram-controlled processors, without at the same time considerably increasing the number of circuits used, the macro and microinstructions have the same format. This permits a circuit design for the instruction control unit which is such that simple macroinstructions for performing simple functions, such as "load register", "store register in main storage", and the like, can be directly executed. More complex macroinstructions, such as floating point operations or decimal arithmetic functions, are interpretatively executed, but by means of microinstructions which are also directly executable, using the same circuits. The directly executable microinstructions are identical with the previously mentioned directly executable simple macroinstructions which also occur directly in the user program.

Thus, a user program consists of a sequence of simple and complex macro instructions. For instruction execution, it is determined in advance by testing the operation code whether the instruction to be currently processed is one which can be directly executed or one which has to be interpreted by other directly executable instructions. As a function of the test result, a switch is set, switching the instruction control unit either to the micro or the macro mode. For more complex macroinstructions, a branch is taken to an interpretation unit which is a normal micro program control with a control storage and an instruction sequence control. Since all macroinstructions can now be executed by the instruction execution hardware, the more complex macroinstructions, similar to the simple macroinstructions, are transferred from the interpretation unit to the instruction execution unit.

The chief disadvantage of such an arrangement is that the design and flexibility of the processor architecture and the instruction set are restricted, since extreme care must be taken that the simple macroinstructions suit the more complex macroinstructions and vice versa. In addition, processing time is lost by testing the operation code for complex or simple macro instructions.

Accordingly it is an object of this invention to provide an improved microprogram-controlled processor.

It is another object of this invention to provide for the direct hardware controlled execution of instructions in a microprogram-controlled processor.

It is a further object of this invention to provide a control unit for a microprogram-controlled processor which is flexible with regard to the design of the instruction sets and which has a high processing speed and reduced circuit requirements with respect to the instruction decoder.

DISCLOSURE OF THE INVENTION

This invention proposes the direct hardware controlled execution of macroinstructions in a microprogram-controlled processor. Hardware control words rather than microinstructions are used to carry out the macroinstructions. Each hardware control word contains a single mode control bit as well as a plurality of direct control bits. The mode control bit activates a mode latch which is capable of switching the operation of the control unit of the processor from a microprogram-controlled operation to a hardware controlled operation, and vice versa, depending on the state of the mode control bit. The plurality of direct control bits directly control the operation of various functions within the processor. Either single or multiple hardware control word operation is possible.

The processor has the option of operating in the conventional microprogram control mode or it may be operated under the direct hardware control execution of microinstructions according to the present invention. The particular operating mode chosen depends the status of the aforementioned mode latch. When the direct hardware controlled operation is chosen, hardware control words associated with the macroinstruction to be directly executed are fed from a control storage. The hardware control word contains a mode control bit with signals that the direct hardware control mode is to be executed. The remainder of the hardware control word contains a plurality of control bits. Each of these control bits directly executes a hardware function without necessity of using microinstructions.

When a macroinstruction is to be directly executed, the selected macroinstruction is fed from the main storage to a control storage address register. The hardware control word associated with the macroinstruction received by the control storage address register is addressed in the control storage. This addressed hardware control word is then fed to the micro operation instruction register. The first bit of the hardware control word found in the microinstruction operation register is the mode control bit. As previously mentioned, this signals the instruction unit that the hardware control mode is to be executed. The remainder of the hardware control words in the micro operation instruction register are directly outputted to provide control signals of the data flow.

The directly executed output signals from the microinstruction operation register can provide up to five output signals. If more than five output signals are needed, then an operation decoder must be utilized. To obtain these additional control signals, the microinstruction that is outputted from main storage is also sent to a macro operation instruction register which operates in parallel to the control storage address register. The macroinstruction found in the macroinstruction operation register is output to the operation decoder where the bits in the macroinstruction are operated upon by the operation decoder to generate a second set of control signals. This second set of control signals is then used to provide additional control of the data flow. The number of control signals generated by the operation decoder is dependent upon the length of the macroinstruction found in the macroinstruction operation register.

BRIEF DESCRIPTION OF THE DRAWINGS

FIG. 4 is a diagrammatic representation of another format of the control words according to the instant invention.

FIG. 5 is a diagrammatic representation of how the control storage is occupied by control words in the case of single word control.

BEST MODE FOR CARRYING OUT THE INVENTION

Figure 1:
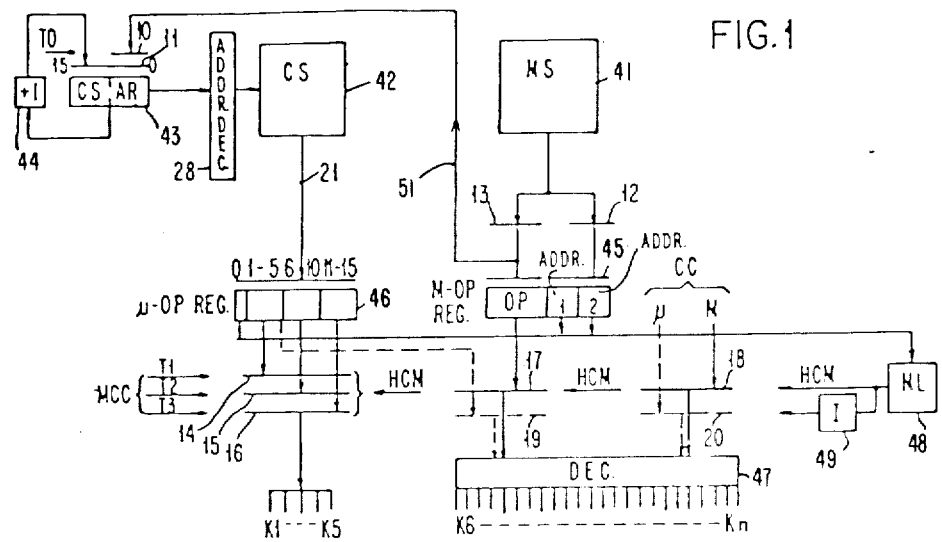
FIG. 1 is a block diagram of a microprogram-controlled processor for the directly hardware-controlled execution of particular instructions by means of single control words.

FIG. 1 shows a part of the control unit of a microprogram-controlled processor which has an additional operating mode in which it is capable of performing particular functions under direct hardware control. Such directly hardware-controlled functions are instruction phases (I-phases) as well as particular execution phases (E-phases) of instructions.

The user programs and data are stored in the usual manner in main storage (MS) 41. The macroinstructions of the user program are fed through a set of gate circuits 12 and 13 to the macro operation register (M-OP-REG) 45. This register has a storage field for the operation code OP as well as two address fields for the addresses ADR1 and ADR2.

For the conventional microprogram-controlled execution of macroinstructions, the operation code, upon storage in the macro operation register 45, is simultaneously fed through a gate circuit 10 via line 51 to the control storage address register (CSAR) 43, addressing in control storage (CS) 42 a storage location containing the address of the first instruction of a micro routine, by means of which the macroinstruction is executed. The subsequent instructions, of which the micro routine consists, are read from the control storage 42 by means of an address modifier 44 which modifies the respective address contained in control storage address register 43 and transfers it to the control storage address register 43 through gate circuit 11. The microinstructions read from the control storage 42 are successively fed to a microinstruction operation register ($\mu$-OP-REG) 46 from where they are transferred through gate circuits 19 and 20 to the operation decoder (DEC) 47 which outputs the control signals Ki for controlling the requested micro operations through data flow control gates (not shown). The data flow control signals are associated with the relevant instruction cycle times Ti by cycle counters (not shown), by means of which signals, corresponding to the individual instruction cycle times, are fed to operation decoder 47 through gates 18 and 20. FIG. 1 is a schematic of how the output signals CC of the cycle counters (not shown) are transferred to the operation decoder 47 for the microinstructions ($\mu$) on the one hand and the macroinstructions (M) on the other. The signal curve for the conventional microprogram control is marked by broken lines in FIG. 1.

The special feature of the instruction control unit shown in FIG. 1 is, as previously mentioned, an additional control mode which permits the instruction control unit to perform particular functions under direct hardware control. Instructions, for which this direct hardware control is to be activated, comprise a mode control bit MCB, set to binary 1, in the first bit position 0 of the instruction format. If this mode control bit is set to binary 0, this special operating mode is deactivated, and the control unit operates in the conventional microinstruction mode.

A mode control bit (MCB) set to binary 1 causes a mode latch (ML) 48 to be set to the hardware control mode, in which it outputs the appropriate signal for the hardware control mode (HCM). This signal respectively enables gate circuits 14 to 18 and prepares them for switching. As a result, it is specified to the operation decoder 47 whether microinstructions or directly executed macroinstructions are to be performed.

For the direct execution of macroinstructions, the control storage 42 is not required to output microinstructions. It is loaded with the operation code (OP) of the macroinstruction as an address through gate circuit 10, addressing the control storage address register 43. In the hardware control mode (HCM), a hardware control word (HCW), instead of the microinstruction, is read from the addressed position in control storage and transferred to the microinstruction operation register 46. As can be seen from FIG. 1, the hardware control word consists of the bits 1 to 15 which are direct control bits or control signals K1 to K5 of the data flow. As direct control signals they can be generated very rapidly since unlike the operation code of a normal microinstruction, they do not have to be decoded in a multi-step logic process of an operation decoder, so that longer instructions are suitable for controlling the first cycles, e.g., cycles T1 to T3, as shown in FIG. 1.

Thus, directly or partly-directly controlled macroinstructions can be executed more rapidly than only purely microprogram-controlled macroinstructions. In addition, FIG. 1 shows that the operation decoder 47 has a simpler and cheaper design since the first control signals K1 to K5 are generated by a total number of N control signals, without the operation decoder 47 being involved. The remaining control signals K6 to KN in combination with the cycle times Ti of the macro cycle counter (MCC) 31 are generated by the operation decoder 47 from the decoded operation code of the macroinstruction.

Figure 2:
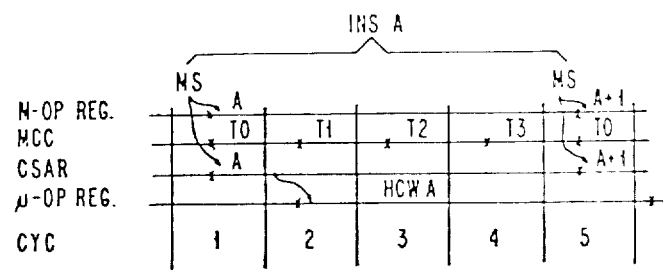
FIG. 2 is a signal/time diagram depicting the operating sequence in the processor according to FIG. 1.

FIG. 2 is a schematic of the execution of an instruction in the single word mode of the control unit shown in FIG. 1. The macroinstruction INS A comes from main storage (MS) 42 and is loaded into the macro operation register 45. In parallel to this operation, the operation code of this macroinstruction is set in the control storage address register 43 where it addresses a hardware control word HCW. At the same time, the macro cycle counter MCC is set to T0. As shown in FIG. 2, this is done in cycle CYC1. This is followed by the first cycle of the instruction INS A under control of the cycle time T0 of the macro cycle counter MCC. In cycle CYC2, the hardware control word HCW A is set in microinstruction operation register 46 where it remains for the entire time it takes to execute the microinstruction.

Figure 3:
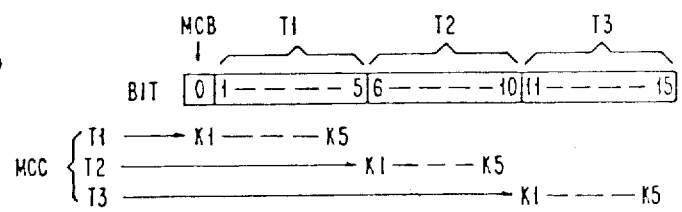
FIG. 3 is a diagrammatic representation of one format of the control words according to the instant invention.

The format of a hardware control word HCW is shown in FIG. 3. The bit 0 serves as a mode control bit MCB which in the case of a binary 0 switches the control unit to the normal microinstruction control mode and in the case of a binary 1 to the directly hardware-controlled mode. The bits 1 to 5 represent the control signals K1 to K5, as are required at the cycle time T1 of the macro cycle counter MCC. The bits 6 to 10 correspond to the same control signals, but at the cycle time T2 of the macro cycle counter. Finally, bits 11 to 15 are associated with the cycle time T3 of the macro cycle counter.

Figure 11:
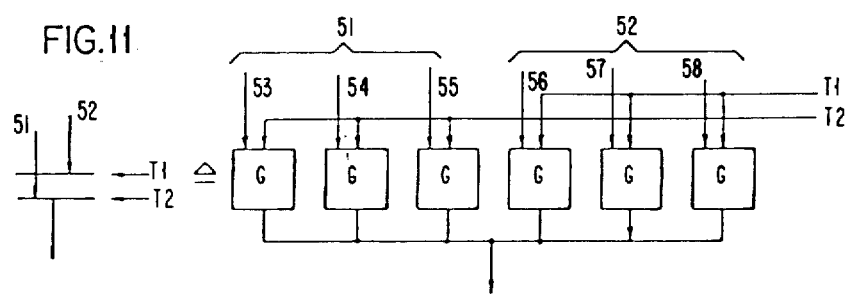
FIG. 11 is a representation explaining the gate circuits used in the instant invention.

The aforesaid control signals are outputted by gate circuits 14, 15 and 16 at the relevant clock times T1 to T3. FIG. 11 explains the representation chosen in FIGS. 1, 6 and 9 for the gate circuits. In the example of FIG. 11, lines 51 and 52 each consist of three individual cores 53 to 55 and 56 to 58, respectively. Each of these cores is associated with a gate circuit G, to whose input it is connected. The second input is connected to a clock control line, to which a signal corresponding to the respective cycle times T1 or T2 is applied. For generating the control signals K1 to K5 at the appropriate cycle times, an arrangement as shown in FIG. 4 may be used. After the control unit has been switched to the hardware control mode by the mode control bit MCB of bit position 0 of the hardware control word read from control storage 42, using the mode latch 48, which subsequently generates the signal HCM for the hardware control mode, the bits at positions 1 to 5 of the micro instruction operation register 46 can be applied to the data flow control gates by the gate circuit group 14 at the cycle time T1. In the subsequent cycle T2 of the macro cycle counter MCC, the bit positions 6 to 10 are applied to the data flow control gates, and at the cycle time T3, the control signals in bit positions 11 to 15 of the microinstruction operation register 46 are transferred to the control gates of the data flow of the processor by gate circuits 15 and 16, respectively.

The bottom portion of FIG. 4 is a cycle time related representation of the control signals K1 to K5 showing that, for example, the control signal K5 is inactive (bit=binary 0) at the cycle times T1 and T2 of the macro cycle counter, but active (bit=binary 1) at the cycle time T3. The previously explained arrangement can be used to advantage if only a relatively small number of control signals are to be generated. The advantage is that the control word required for each directly executed instruction is contained in the operation code table 26 in control storage 42. Since the operation code of the instruction and addressing of the operation code table are permanently linked with each other, this location in control storage 42 would remain unoccupied otherwise, so that the capacity of control storage 42 would be inadequately utilized.

Figure 6:
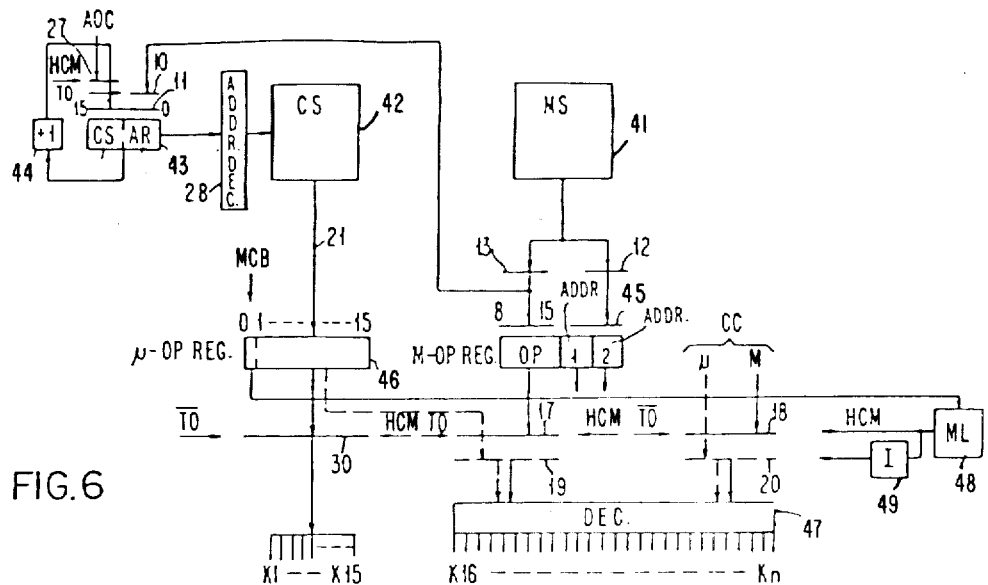
FIG. 6 is a block diagram of a microprogram-controlled processor for the direct execution of direct instructions by means of multiple control words.

In the multiple control word mode, which is an alternative operating mode, the operation code OP, analogously to the first operating mode, is transferred at cycle time CYC1 (FIG. 7) from macro operation register 65, to control storage 62 (see FIG. 6) The addressed hardware control word is stored in the microinstruction operation register 66 in cycle CYC2, i.e., at cycle time T1 of the macro cycle counter MCC. The hardware control word again consists of the mode control bit MCB as well as the 15 bits forming the control signals K1 to K15, as shown in FIGS. 6 and 8. These 16 control signals together with the additional N-16 control signals, generated by the operation decoder 67 from the decoded operation code of the macroinstruction, control the entire data flow of the processor. Note that the the subdivision into directly and indirectly generated control signals (i.e., control signals obtained by decoding the OP code), as shown in FIGS. 1 and 6, is not binding and can be altered so as to optimize the actual conditions of a real processor.

When the instruction INS A is processed, the first hardware control word read (FIG. 7) is indicative of the state of the control signals K1 to K15 at cycle time T1 of the macro cycle counter MCC. The second hardware control word reflects the state of the control signals K1 to K15 during the cycle time T2 and the third hardware control word the same control signals at cycle time T3.

Figure 9:
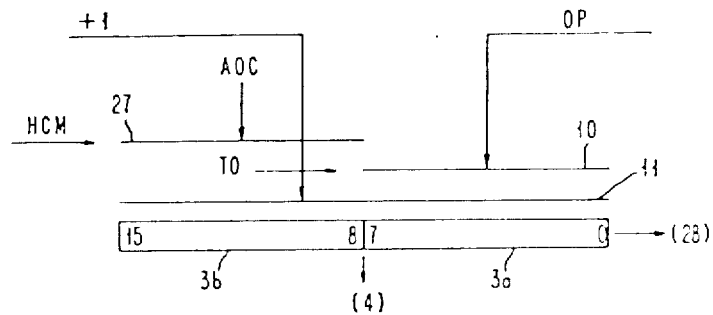
FIG. 9 is a diagrammatic representation of the control storage address register used in the processor according to FIG. 6.

The address generation for control storage 62 for fetching the three above-mentioned hardware control words (1st HCW, 2nd HCW, 3rd HCW) is shown more clearly in FIG. 9. The control storage address register 63 consists of a first part for accommodating the low-order address bits 0 to 7, which correspond to the operation code OP, as well as a second part for storing the high-order address bits 8 to 15. As previously explained in connection with FIG. 1, the 1-byte wide operation code OP is fed from the output of gate circuit 13 and through gate circuit 10 to bit positions 0 to 7 of the control storage address register 43. Through the gate circuit 27, which is controlled by the control signal HCM for the hardware control mode, the additional operation code bits (AOC) are fed as address bits to the bit positions 8 to 15 of the control storage address register.

Figure 10:
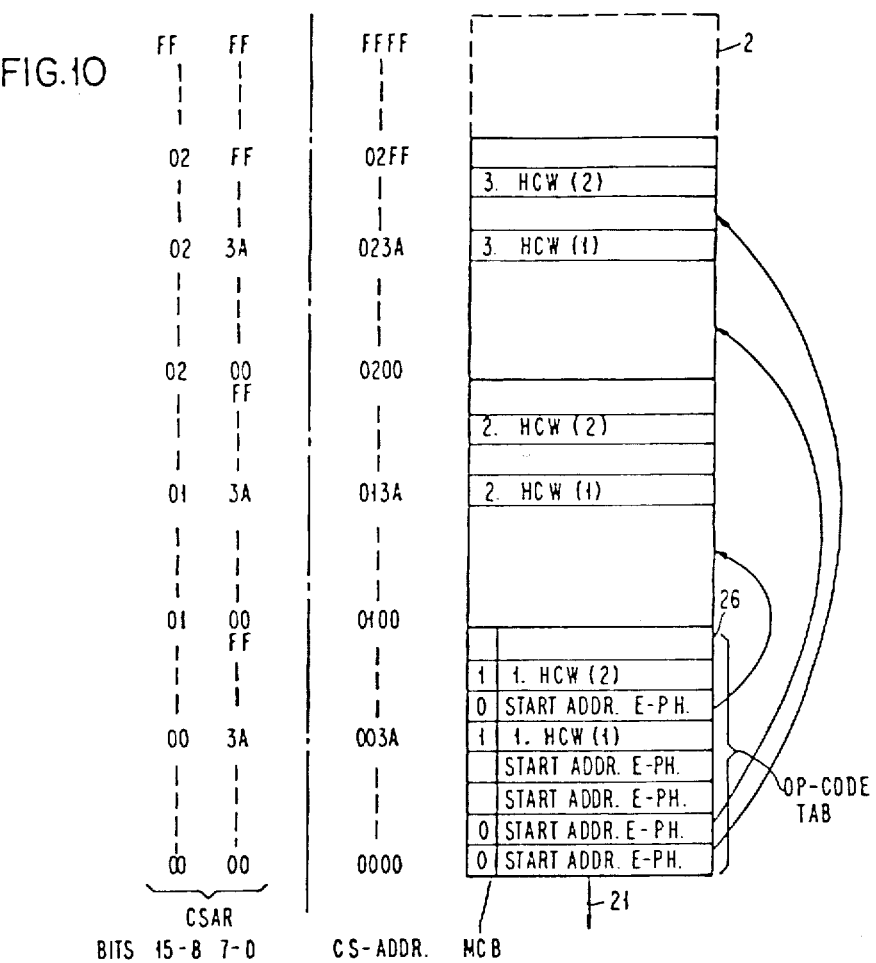
FIG. 10 is a representation of how the control storage is occupied for multiple control word operation.

In the single control word mode, the operation code table 26 in control storage 42 contains, in addition to the start addresses of the micro routines for the execution phases of the macroinstructions, all hardware control words HCW. In the multiple word mode, code table 26 contains (see FIG. 10) only the first hardware control words 1st HCW (1), 1st HCW (2), etc. in addition to the start addresses for the micro routines, with the second and third control words 2nd HCW (1), 2nd HCW (2), 3rd HCW (2), etc. being stored in a particular part of control storage 42, as defined by the respective addresses. This distribution scheme of the hardware control words is based on the fact that the control storage address derived from the operation code is a composite address consisting of the 1-byte wide operation code with the hexadecimal values 00 to FF and the additional 1-byte operation code AOC of, for example, hexadecimal 00 to FF.

Figure 7:
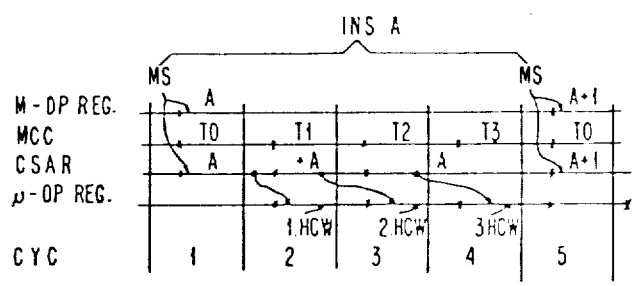
FIG. 7 is a signal/time diagram depicting the operating sequence in the processor according to FIG. 6.
Figure 8:
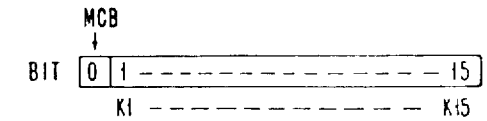
FIG. 8 is a representation of the format of a control word for multiple control word operation.

FIG. 7 shows the time sequence in the multiple control word mode in which, similar to the single control word mode, the operation code, designated as A in the chosen example, is read in instruction cycle CYC1 at cycle time T0 from main storage into the macroinstruction operation register 45 as well as into the control storage address register 43. At the same time, this address is decoded by the control storage address decoder 28 and is available for selecting a control storage word, so that control storage 42 can be read at the addressed location at the next cycle time T1. It is assumed in FIG. 7 that the respective word is a hardware control word, designated by a mode control bit MCB set to binary 1. It is further assumed that this hardware control word HCW is the first of three control words needed for executing the instruction INS A.

In the second instruction cycle CYC2 the first additional operation code byte AOC is fed to control storage address register 43, through gate circuit 27 controlled by hardware control mode signal HCM. This additional operation code byte together with operation code A, stored in control storage address register for the duration of the execution of instruction INS A, forms the new address for reading the second hardware control word (2nd HCW) which is fed to microinstruction operation register 46 at cycle time T2. Finally, the third and last hardware control word (3rd HCW) reaches the micro instruction operation register at cycle time T3, as shown in FIG. 7.

Figure 12:
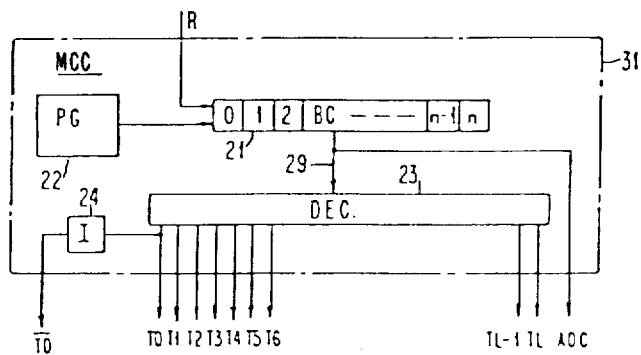
FIG. 12 is a block diagram of the macro cycle counter used in the processor according to FIG. 6.

FIG. 12 is a schematic of how, for example, the time clock signals representing the cycle times T0 to TL are generated. FIG. 12 also shows the generation of the additional operation code byte AOC and the control signal T0. FIG. 12 is a diagrammatic representation of the macro cycle counter MCC. It initially consists of a pulse generator (PG) 22, whose output pulses control a binary counter 21. This counter comprises the stages 0 to n, a reset input R, and an output bus 29 transferring the respective count of binary counter 21 to a decoder (DEC) 23.

The additional operation code bytes AOC correspond to the respective binary values of the count of binary counter 21. The control signal T0, which is for example, required for controlling the gate circuit 30 in FIG. 6, is derived by inversion in inverter (I) 24 from the output signal of decoder 23 corresponding to cycle time T0.

The additional operation code byte can also be generated in another manner, for example, by using the address modifier 44 also for this purpose, and by carries from the low-order address byte being set in the high-order address byte In the single and the multiple control word mode, the circuit arrangement of FIGS. 1 and 6, using the operation code of a macroinstruction as an address, not only allows microinstructions to be read from a control storage but also allows decoded control signals to be fetched from said control storage. The control storage 42 thus contains a mixed sequence of microinstructions and direct data flow control signals A consequence of this is that in the case of short macroinstructions, such as register to register instructions, only direct control signals are read from the control storage. Since the directly generated control signals, which are obtained by decoding, are very fast they are particularly suitable for providing values required within a minimum time during instruction execution. Storage to storage and register to index register instructions are examples of where this increased operating speed is beneficial. Instructions having a length of 4 cycle times are generated by means of mixed data flow control signals. The first instructions are being generated directly, as previously explained, and the remainder are generated in a conventional manner by decoding. In the generally employed pure software mode, all control signals are obtained by decoding the microinstruction operation code.

While the invention has been particularly shown and described with reference to a first and a second embodiment thereof, it will be understood by those skilled in the art that various changes in form and details may be made therein without departing from the spirit and scope of the invention.

What is claimed is:

1. In a microprogram-controlled processor which carries out macroinstructions by either execution of a series of microinstructions which are routed to the operation decoder or by direct routing of said macroinstruction to said operation decoder from the macroinstruction operation register, comprising:
    a control storage for storing a hardware control word which controls said direct routing of a macroinstruction, said hardware control word comprising a mode control bit and a plurality of direct control bits;
    a microinstruction operation register connected to said control storage for reading said hardware control word from said control storage and for generating control signals from said plurality of direct control bits contained in said hardware control word;
    first gating means coupled to said microinstruction operation register for outputting said generated control signals; and
    second gating means coupled to said macroinstruction operation register for directly routing said macroinstruction to said operation decoder;
    a mode latch connected to said microinstruction operation register, said mode latch being activated by said mode control bit having a preselected value indicating that a macroinstruction is to be directly routed to said operation decoder, said mode latch controlling said first and second gating means, whereby the execution of said macroinstruction is controlled by said control signals.

2. Apparatus according to claim 1 wherein a third gating means corprises a macro cycle counter for generating cycle times during which said control signals are generated.

3. In a microprogram-controlled processor which carries out macroinstructions by either execution of a series of microinstructions which are routed to the operation decoder or by direct routing of said macroinstruction to said operation decoder from the macroinstruction operation register comprising:
    a storage unit for storage of said macroinstructions;
    a control storage address register connected to said storage unit for receiving a macroinstruction;
    said macroinstruction operation register connected to said storage unit operating in parallel to said control storage address register for storing said macroinstruction simultaneous to the receipt of said macroinstruction by said control storage address register;
    a control storage connected to said control storage address register for storing a hardware control word addressed by said macroinstruction in said control storage address register, said hardware control word comprising a mode control bit and a plurality of direct control bits;
    a macroinstruction operation register connected to said control storage for reading said hardware control word from said control storage and for generating a first set of control signals from said plurality of direct control bits contained in said hardware control word;
    first gating means connected to said microinstruction operation register for controlling the output of said first set of control signals;
    said operation decoder connected to said macroinstruction operation register for decoding said macroinstruction routed from said macroinstruction operation register through a second gating means and for generating therefrom a second set of control signals;
    a mode latch connected to said microinstruction operation register for controlling said first and second gating means in response to said mode control bit in said hardware control word having a preselected value, whereby said macroinstruction is executed by said first and second sets of control signals.

4. Apparatus according to claim 3 wherein said first and said second gating means are further controlled by a macro cycle counter for generating cycle times during which said first and said second set of control signals are outputted.

5. Apparatus according to claim 4 where said first set of control signals are outputted prior to selected ones of said second set of control signals.

6. In a microprogram-controlled processor which carries out macroinstructions by either execution of a series of microinstructions which are routed to the operation decoder or by direct routing of said macroinstruction to said operation decoder from the macroinstruction operation register, comprising:
    control storage means for storing a plurality of hardware control words which control the execution of a macroinstruction, a first of said plurality of hardware control words comprising a mode control bit and a plurality of direct control bits, and the remainder of said plurality of hardware control words comprising a plurality of direct control bits;
    a microinstruction operation register connected to said control storage means for reading said plurality of hardware control words one at a time beginning with said first of said plurality of hardware control words, and for generating control signals from said plurality of direct control bits contained in said plurality of hardware control words;
    first gating means coupled to said microinstruction operation register for outputting said generated control signals;

second gating means connected to said control storage means for routing said remainder of said plurality of hardware control words to said microinstruction operation register; and a mode latch connected to said microinstruction operation register and activated by said mode control bit in the first one of a said plurality of hardware control words, said mode latch switching said first and second gating means when said mode control bit is a selected value which indicates that a macroinstruction is to be directly routed to said operation decoder for execution whereby the execution of said macroinstruction is controlled by said plurality of control signals generated from said plurality of hardware control words.

7. In a microprogram-controlled processor which carries out macroinstructions by either execution of a series of microinstructions which are routed to the operation decoder or by direct routing of said macroinstruction to said operation decoder from the macroinstruction operation register, comprising:

control storage means for storing a plurality of hardware control words which direct the execution of a directly routed macroinstruction a first of said plurality of hardware control words comprising a mode control bit and a plurality of direct control bits, and the remainder of said plurality of hardware control words comprising a plurality of direct control bits;

a macroinstruction operation register connected to the main storage for storing said macroinstruction;

a microinstruction operation register connected to said control storage means for reading said plurality of hardware control words one at a time beginning with said first of said plurality of hardware control words, and for generating a first set of control signals from said plurality of direct control bits contained in said plurality of control words;

a first gating means coupled to said microinstruction operation register for outputting said first set of generated control signals;

an operation decoder connected to said macroinstruction operation register for decoding said macroinstruction contained in said macroinstruction operation register, said operation decoder generating therefrom a second set of control signals;

a second gating means connected between said macroinstruction operation register and said operation decoder for directing the macroinstruction to said operation decoder during said direct routing of said macroinstruction;

third gating means connected between said control storage means and said microinstruction register for directing of said remainder of said plurality of hardware control words to said microinstruction register; and a mode latch connected to said microinstruction operation register which enables said first, second, and third gating means in response to said mode control bit in said first of said plurality of hardware control words having a preselected value to control the execution of said directly routed microinstruction.

* * * * *

UNITED STATES PATENT AND TRADEMARK OFFICE
CERTIFICATE OF CORRECTION

PATENT NO. : 4,631,663

DATED : December 23, 1986

INVENTOR(S) : Herbert Chilinski et al

It is certified that error appears in the above-identified patent and that said Letters Patent is hereby corrected as shown below:

Col. 10, line 16    "macroinstruction" should read --microinstruction--.

Signed and Sealed this

Seventeenth Day of May, 1988

Attest:

DONALD J. QUIGG

*Attesting Officer*    *Commissioner of Patents and Trademarks*